(12) United States Patent
Pang et al.

(10) Patent No.: US 7,387,492 B2
(45) Date of Patent: Jun. 17, 2008

(54) METHODS AND APPARATUS FOR COOLING TURBINE BLADE TRAILING EDGES

(75) Inventors: Tingfan Pang, West Chester, OH (US); Ching-Pang Lee, Cincinnati, OH (US); Kevin Samuel Klasing, Springboro, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 247 days.

(21) Appl. No.: 11/312,059

(22) Filed: Dec. 20, 2005

(65) Prior Publication Data

US 2007/0140850 A1    Jun. 21, 2007

(51) Int. Cl.
*F01D 25/12* (2006.01)
(52) U.S. Cl. .................... 416/97 R; 164/132
(58) Field of Classification Search ............. 416/96 R, 416/97 R; 415/115; 164/132
See application file for complete search history.

(56) References Cited

U.S. PATENT DOCUMENTS

| 4,229,140 A | * | 10/1980 | Scott | ............. 416/97 R |
| 4,616,976 A | | 10/1986 | Lings et al. | |
| 5,378,108 A | * | 1/1995 | Zelesky | ................ 416/97 R |
| 5,800,124 A | | 9/1998 | Zelesky | |
| 6,019,579 A | | 2/2000 | Fukuno et al. | |
| 6,264,426 B1 | | 7/2001 | Fukuno et al. | |
| 6,290,463 B1 | | 9/2001 | Fargher et al. | |
| 6,481,967 B2 | | 11/2002 | Tomita et al. | |
| 6,551,063 B1 | * | 4/2003 | Lee et al. | ............. 416/97 R |
| 6,609,891 B2 | * | 8/2003 | Leeke et al. | ............ 416/97 R |
| 6,612,811 B2 | | 9/2003 | Morgan et al. | |
| 6,675,582 B2 | | 1/2004 | Monty et al. | |
| 6,746,209 B2 | | 6/2004 | DeMarche et al. | |
| 7,014,424 B2 | * | 3/2006 | Cunha et al. | ........... 416/97 R |
| 7,165,940 B2 | | 1/2007 | McGrath et al. | |

* cited by examiner

*Primary Examiner*—Ninh H Nguyen
(74) *Attorney, Agent, or Firm*—William Scott Andes, Esq.; Armstrong Teasdale LLP

(57) ABSTRACT

A method facilitates fabricating an airfoil for use with a turbine blade. The method comprises forming a substantially solid ceramic airfoil core, inserting the core into a die and casting the airfoil with a pressure side wall and a suction side wall connected together at a leading edge and a trailing edge, such that a plurality of first trailing edge slots and at least one second trailing edge slot extend from the trailing edge along the pressure side wall, wherein the second trailing edge slot has a length, measured between an inlet and an exit of the slot, that is longer than a corresponding length of each of the plurality of first trailing edge slots.

20 Claims, 3 Drawing Sheets

METHODS AND APPARATUS FOR COOLING TURBINE BLADE TRAILING EDGES

BACKGROUND OF THE INVENTION

This invention relates generally to gas turbine engines and more particularly, to methods and apparatus for cooling a turbine blade trailing edge.

At least some known turbine engines include a core engine having, in serial flow relationship, a high pressure compressor which compresses an airflow entering the core engine, a combustor which ignites a mixture of fuel and compressed air to generate hot propulsive gases, and a high pressure turbine which is rotated by the hot propulsive gases. The high pressure turbine is connected to the high pressure compressor by a shaft such that the high pressure turbine blades drive the high pressure compressor. Additional compressors and turbine blades (e.g., a low pressure compressor and a low pressure turbine) may be positioned in serial flow relationship with the core engine.

Each turbine blade includes a pair of sidewalls that are connected at a leading edge and a trailing edge. The metal temperature distribution of a typical blade is such that the trailing edge of the blade is significantly hotter than the temperature of the bulk of the blade. The temperature gradient created may result in high compressive stress at the blade trailing edge, and the combination of high stresses and high temperatures may result in the blade trailing edge being the life limiting location of the blade.

Accordingly, within at least some known turbine blades, the blade trailing edge is cooled by a film of cooling air discharged from an internally-defined blade cavity. More specifically, the film of cooling air is discharged through a plurality of trailing edge slots formed on the airfoil pressure side, and upstream from the airfoil trailing edge. Specifically, known trailing edge cooling slots are cast in a row wherein each of the slots has the same length. As such, within known blades, the inlets of adjacent slots and the exits of adjacent slots are substantially radially aligned along the blade trailing edge. Although such slot orientations may be sufficient to satisfy blade mechanical and thermal requirements, such slot geometries may also mechanically weaken the blade near the inlets of some of the slots. For example, during operation, the weakened trailing edge area may develop undesirable vibratory stresses, which over time, may cause radial cracking and/or material losses within the blade trailing edge. Moreover, thin areas within the blade trailing edge may also increase the likelihood that a portion of the blade may fail due, at least in part, to high centrifugal stresses induced during operation.

BRIEF SUMMARY OF THE INVENTION

In one aspect, a method for fabricating an airfoil for use with a turbine blade is provided. The method comprises forming a substantially solid ceramic airfoil core, inserting the core into a die and casting the airfoil with a pressure side wall and a suction side wall connected together at a leading edge and a trailing edge, such that a plurality of first trailing edge slots and at least one second trailing edge slot extend from the trailing edge along the pressure side wall, wherein the second trailing edge slot has a length, measured between an inlet and an exit of the slot, that is longer than a corresponding length of each of the plurality of first trailing edge slots.

In another aspect an airfoil for a rotor blade is provided. The airfoil includes a pressure side wall, a suction side wall connected to the pressure side wall at a leading edge and a trailing edge, a plurality of first trailing edge slots extending from the trailing edge along the pressure side wall and at least one second trailing edge slot extending from the trailing edge along the pressure side wall. The plurality of first trailing edge slots and the at least one second trailing edge slot each include an inlet, an exit, and have a length measured therebetween. The at least one second trailing edge slot has a length that is longer than a length of each of the plurality of first trailing edge slots.

In a further aspect, a turbine blade is provided. The turbine blade includes a platform, a dovetail extending radially inward from the platform, and an airfoil extending radially outward from the platform. The airfoil includes a pressure side wall, and a suction side wall. The pressure side wall is connected to the suction side wall at a leading edge and a trailing edge. The airfoil also includes a plurality of first trailing edge slots and at least one second trailing edge slot. The plurality of first trailing edge slots and the at least one second trailing edge slot each extend from the trailing edge along the pressure side wall, and each includes an inlet, an exit, and has a length measured therebetween. The at least one second trailing edge slot has a length that is longer than a length of each of the plurality of first trailing edge slots.

DETAILED DESCRIPTION OF THE INVENTION

Figure 1:
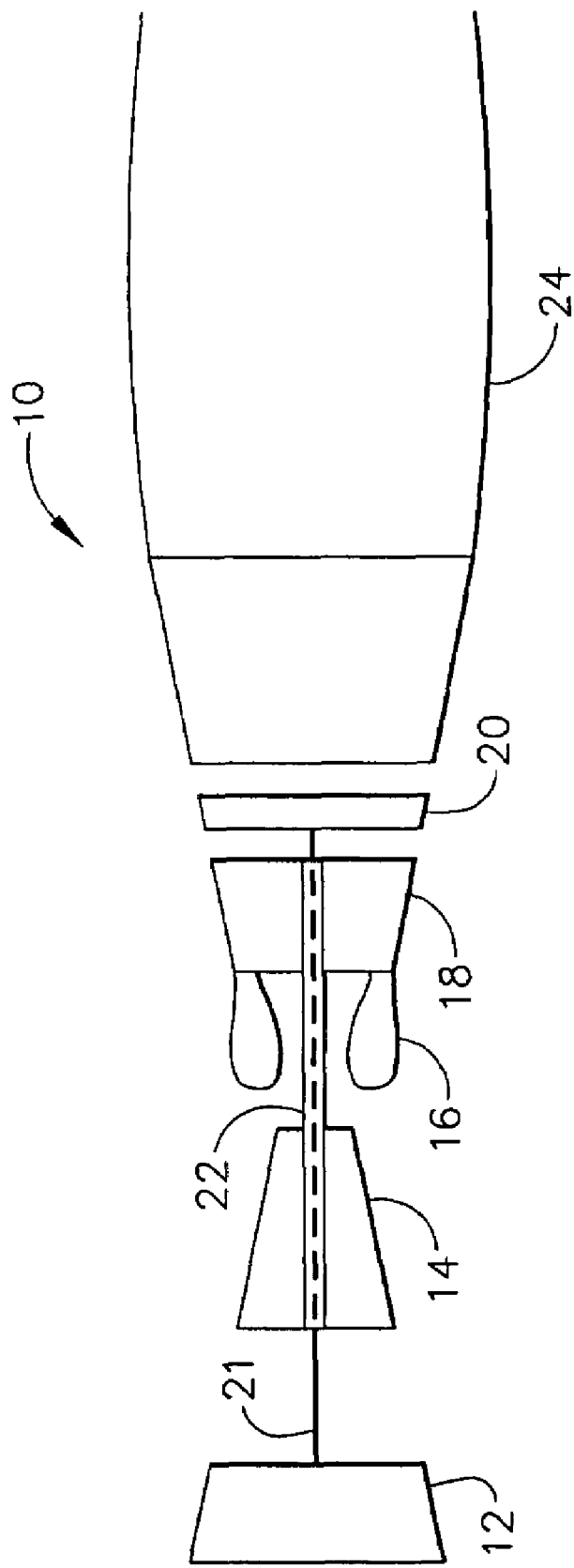
FIG. 1 is a schematic illustration of an exemplary gas turbine engine.

FIG. 1 is a schematic illustration of an exemplary gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 21, and compressor 14 and turbine 18 are coupled by a second shaft 22. In one embodiment, gas turbine engine 10 is an LM2500 engine commercially available from General Electric Aircraft Engines, Cincinnati, Ohio. In another embodiment, gas turbine engine 10 is a CFM engine commercially available from General Electric Aircraft Engines, Cincinnati, Ohio.

In operation, air flows through low pressure compressor 12 supplying compressed air from low pressure compressor 12 to high pressure compressor 14. The highly compressed air is delivered to combustor 16. Airflow from combustor 16 is channeled through a turbine nozzle (not shown in FIG. 1) to drive turbines 18 and 20, prior to exiting gas turbine engine 10 through an exhaust nozzle 24.

Figure 2:
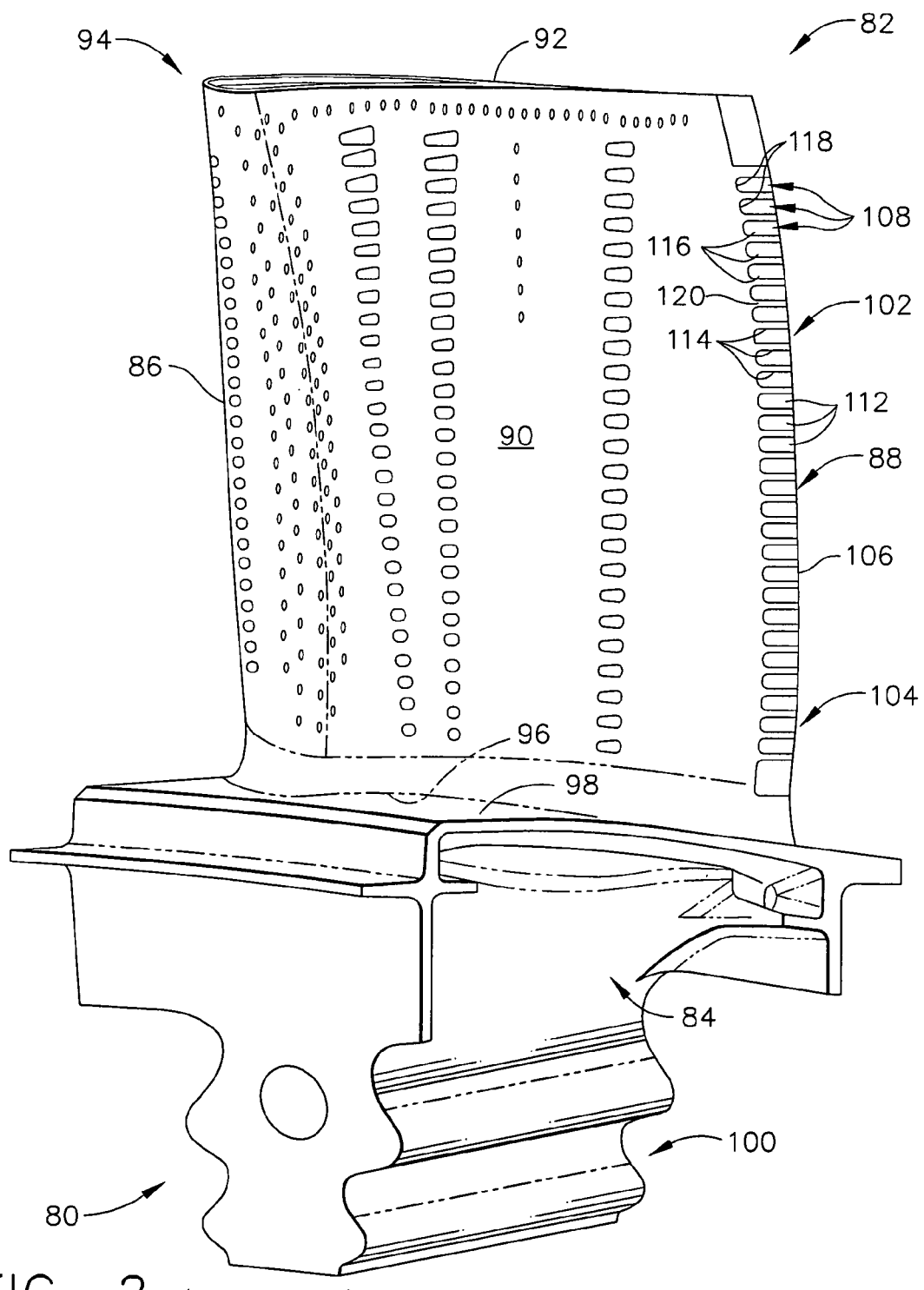
FIG. 2 is a perspective view of an exemplary high pressure turbine blade that may be used with the gas turbine engine shown in FIG. 1.
Figure 3:
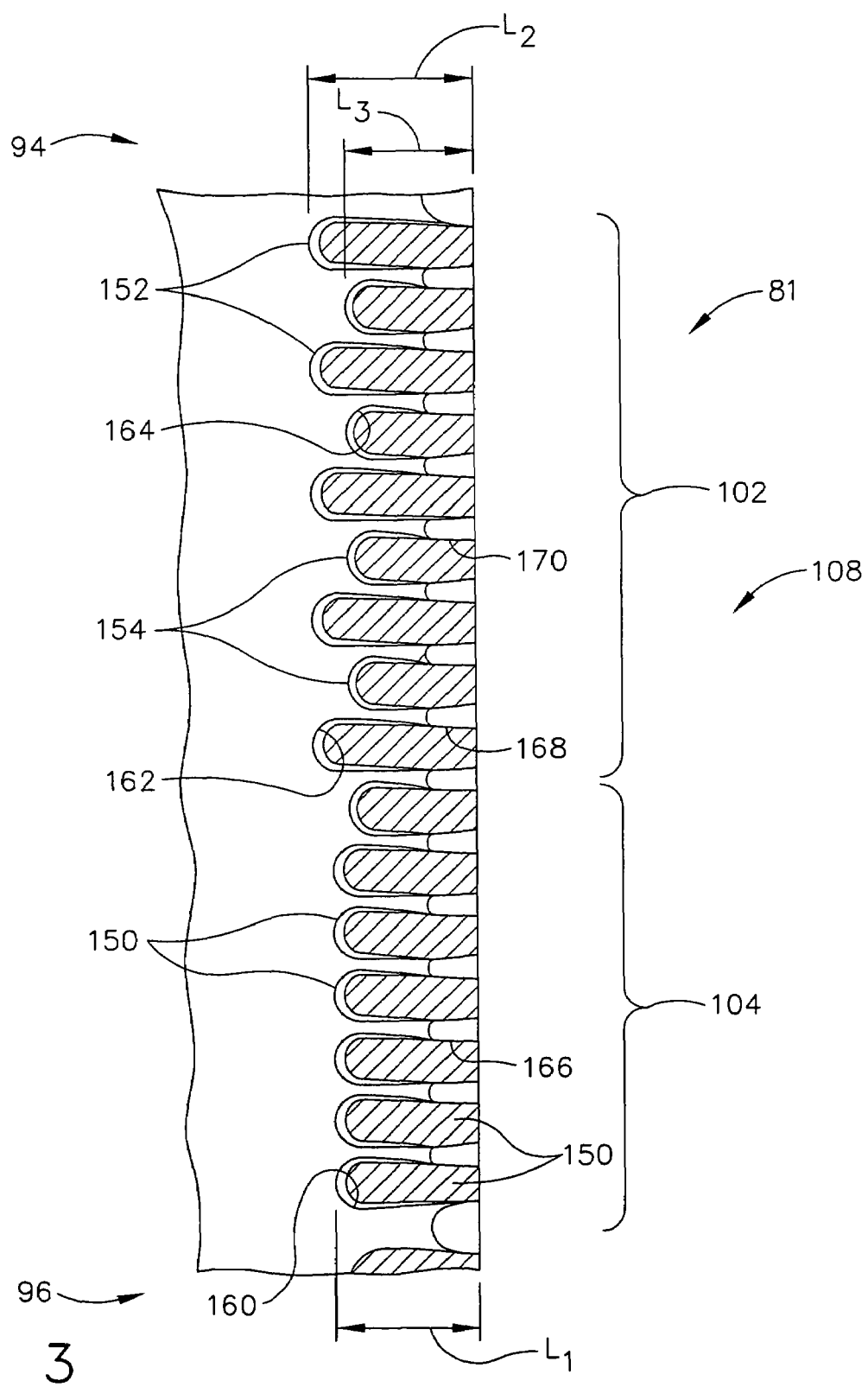
FIG. 3 is an enlarged schematic view of a trailing edge slot pattern that may be used with the turbine blade shown in FIG. 2.

FIG. 2 is a perspective view of an exemplary high pressure turbine blade 80 that may be used with gas turbine engine 10 (shown in FIG. 1). FIG. 3 is an enlarged schematic view of a trailing edge slot pattern 81 that may be used with turbine blade 80. Blade 80 includes an airfoil 82 connected to a shank 84. Airfoil 82 includes a leading edge 86, a trailing edge 88, a pressure side wall 90, and a suction side wall 92. Pressure side wall 90 is connected to suction side wall 92 at leading edge 86 and trailing edge 88. Airfoil 82 also includes a tip 94 and a root 96 that is radially inward from tip 94. Pressure side wall 90 and suction side wall 92 extend radially or longitudinally between tip 94 and root 96.

In the exemplary embodiment, shank 84 includes a platform 98 and a dovetail 100. Platform 98 extends between dovetail 100 and airfoil 82 such that airfoil root 96 is adjacent platform 98 and airfoil 82 extends generally radially outward from platform 98.

In the exemplary embodiment, airfoil 82 includes a trailing edge upper portion 102 which extends from tip 94, and a trailing edge lower portion 104 which extends to root 96. As such, trailing edge upper portion 102 extends from tip 94 to trailing edge lower portion 104, and lower portion 104 extends between upper portion 102 and root 96.

Turbine blade 80 includes at least one cooling cavity (not shown) defined between pressure side wall 90 and suction side wall 92. The cooling cavity is in flow communication with a plurality of trailing edge slots 108 which extend along trailing edge 88. More specifically, trailing edge slots 108 extend along pressure side wall 90 to trailing edge 88 and are spaced radially between tip 94 and root 96 within trailing edge upper and lower portions 102 and 104, respectively. A plurality of lands or partition walls 120 separate each trailing edge slot 108 from an adjacent trailing edge slot 108.

Trailing edge slots 108 are oriented such that slot pattern 81 extends from airfoil tip 94 through trailing edge portions 102 and 104 to root 96. More specifically, in the exemplary embodiment, airfoil trailing edge slots 108 include a plurality of first slots 150, a plurality of second slots 152, and a plurality of third slots 154. Each of slots 150, 152, and 154 has a respective inlet 160, 162, and 164 and a respective exit 166, 168, and 170 that is downstream from each inlet 160, 162, and 164 and adjacent trailing edge 88. Accordingly, each slot 150, 152, and 154 has a respective length $L_1$, $L_2$, and $L_3$ measured between each respective inlet 160, 162, and 164 and each respective slot exit 166, 168, and 170.

In the exemplary embodiment, first slots 150 are only defined, and spaced apart substantially equally, within trailing edge lower portion 104. In an alternative embodiment, at least one first slot 150 is defined within trailing edge upper portion 102. More specifically, in the exemplary embodiment, trailing edge lower portion 104 only includes first slots 150, and slots 150 are oriented such that the plurality of first slot inlets 160 are substantially radially aligned with each other and such that the plurality of first slot exits 166 are substantially radially aligned with each other.

In the exemplary embodiment, second slots 152 and third slots 154 are only defined within trailing edge upper portion 102. In an alternative embodiment, at least one second slot 152 or at least one third slot 154 is also defined within trailing edge lower portion 104. In another alternative embodiment, airfoil 80 includes a plurality of second slots 152 and a plurality of slots having a plurality of different lengths. In the exemplary embodiment, second slot length $L_2$ is longer than first slot length $L_1$ and longer than third slot length $L_3$, and third slot length $L_3$ is shorter than first slot length $L_1$. Alternatively, slot lengths $L_1$, $L_2$, and $L_3$ may be variably selected to enable airfoil 80 to function as described herein.

Within the trailing edge upper portion 102, second slots 152 and third slots 154 are arranged in an alternating pattern such that each third slot 154 is positioned between a pair of second slots 152 having a longer length $L_2$. More specifically, in the exemplary embodiment, within slot pattern 81, each third slot 154 is positioned between slots 108 having a longer length than the length $L_3$ of each third slot 154. For example, in the exemplary embodiment, a radially inner most third slot 154 within trailing edge upper portion 102 is defined between a first trailing edge slot 150 and a second slot 152 adjacent trailing edge lower portion 104. In the exemplary embodiment, spacing between slots 152 and 154 within trailing edge portion 102 is substantially equal. Alternatively, the size, length, orientation, and number of slots 152 and 154 is variably selected to facilitate an airfoil performing as described herein.

Accordingly, in the exemplary embodiment, between each pair of longer slot partition walls 120, two slots 108 are separated by a shorter partition wall 120. Moreover, and as such, within trailing edge upper portion 102, the inlets 162 and 164 of adjacent slots 108 formed therein are not radially aligned. As a result, the staggered orientation of the inlets 162 and 164 of slots 108 within portion 102 facilitates increasing the overall stiffness of the blade trailing edge 88 within the upper portion 102, and thus facilitates improving the vibratory margin of blade 80 in comparison to known airfoils utilizing trailing edge cooling slots.

During operation, cooling air for the trailing edge 88 enters blade 80 through dovetail 100 and flows radially upward through blade 80 to facilitate convective cooling of the airfoil 82 adjacent slots 108, and film cooling downsteam from slot exits 166, 168, and 170. More specifically, the amount of cooling flow exiting through slots 108 is a function of the pressure ratio between the internal cooling air driving pressure and the external gas static pressure. The internal cooling air driving pressure varies from blade root 96 to tip 94. For example, within trailing edge lower portion 104, the driving pressure may be substantially equal to the local static pressure. As the cooling air is channeled radially upward through airfoil 80, as a portion of the air is discharged from slots 108, the flow rate is reduced which results in a reduction of dynamic pressure. For example, in the trailing edge upper portion 102, the driving pressure may be substantially equal to the local static pressure plus some of the dynamic pressure. The longer partition walls 120 enable more dynamic pressure from the cooling air radial flow to be captured and thus increase the local driving pressure for air leaving slots 108 adjacent to each longer partition wall 120, but not to an extent that flow variation problems are created within airfoil 80.

In each embodiment, the above-described trailing edge slot pattern facilitates improving the stiffness and the useful life of the associated airfoil. Specifically, because the slot inlets within the upper section of the airfoil trailing edge are not radially aligned, radial cracking within the airfoil is facilitated to be reduced, and the stiffness of the upper section is facilitated to be improved. Moreover, the slot pattern facilitates preserving cooling flow uniformity within both the upper and lower trailing edge portions. As a result, an airfoil is provided including a substantially mechanically and thermally balanced blade trailing edge.

In one embodiment, airfoils 80 are fabricated by casting a core (not shown). The core is fabricated by injecting a liquid ceramic and graphite slurry into a core die (not shown), and the slurry is heated to form a solid ceramic airfoil core. The airfoil core is suspended in an airfoil die (not shown) and hot wax is injected into the airfoil die to surround the ceramic airfoil core. The hot wax solidifies and forms a wax airfoil with the ceramic core suspended in the airfoil.

The wax airfoil with the ceramic core is repeatedly dipped into ceramic slurry to form a ceramic shell outside the wax airfoil. The core, wax, and shell cluster is then heated to an elevated temperature to remove the wax and form a casting mold with ceramic core in the middle. The molten metal is then poured into the hollow casting mold. The molten metal takes the place of the wax airfoil, and forms a metal airfoil with the ceramic core remaining in place. The airfoil is then cooled, and the ceramic core removed.

The above-described turbine blades include a trailing edge cooling slot geometry configuration that facilitates extending a useful life of the turbine blade. Each airfoil includes a row of cooling slots that include a lower portion wherein the slots are substantially radially aligned and an upper portion wherein the cooling slots have different lengths and are staggered rather than being radially aligned. The cooling slots facilitate enhanced cooling and flow regulation with improved manufacturing yields. As a result, the trailing edge cooling slot geometry configuration of the airfoils facilitates extending a useful life of the blades in a cost-effective and reliable manner.

Exemplary embodiments of turbine rotor blades are described above in detail. The trailing edge slot pattern is not limited to use with the specific turbine blade embodiments described herein, but rather, the trailing edge slot pattern can be utilized independently and separately from other rotor components described herein. Moreover, the invention is not limited to the embodiments of the slot patterns described above in detail. Rather, other variations of slot patterns may be utilized within the spirit and scope of the claims.

While the invention has been described in terms of various specific embodiments, those skilled in the art will recognize that the invention can be practiced with modification within the spirit and scope of the claims.

What is claimed is:

1. A method for fabricating an airfoil for use with a turbine blade, said method comprising:
    forming a substantially solid ceramic airfoil core;
    inserting the core into a die;
    casting the airfoil with a pressure side wall and a suction side wall connected together at a leading edge and a trailing edge, such that a plurality of first trailing edge slots, a plurality of second trailing edge slots, and a plurality of third trailing edge slots extend from the trailing edge along the pressure side wall, wherein each of the second trailing edge slots has a length, measured between an inlet and an exit of the slot, that is longer than a corresponding length of each of the plurality of first and third trailing edge slots, and wherein the plurality of second and third trailing edge slots are arranged in an alternating pattern.

2. A method in accordance with claim 1 wherein casting the airfoil further comprises casting the airfoil such that the second trailing edge slot is formed within an upper section of the trailing edge, wherein the trailing edge includes an upper section and a lower section, the upper section being between a tip of the airfoil and the lower section of the trailing edge.

3. A method in accordance with claim 2 wherein casting the airfoil such that the second trailing edge slot is formed within an upper section of the trailing edge further comprises casting the airfoil upper section of the trailing edge to also include at least one third slot that has a length that is shorter than a length of the second trailing edge slot and a length of each of the plurality of first trailing edge slots.

4. A method in accordance with claim 3 wherein casting the airfoil such that the second trailing edge slot is formed within an upper section of the trailing edge further comprises casting the airfoil upper section of the trailing edge to include a plurality of second trailing edge slots and a plurality of third trailing edge slots, wherein each of the third slots has a length that is shorter than a length of the second trailing edge slots and a length of each of the plurality of first trailing edge slots.

5. A method in accordance with claim 4 wherein casting the airfoil upper section of the trailing edge to include a plurality of second trailing edge slots and a plurality of third trailing edge slots further comprises casting the airfoil upper section such that the second and third trailing edge slots are arranged in an alternating pattern that facilitates increasing a stiffness of the airfoil trailing edge.

6. An airfoil for a rotor blade, said airfoil comprising:
    a pressure side wall;
    a suction side wall connected to said pressure side wall at a leading edge and a trailing edge; and
    a plurality of first trailing edge slots extending from said trailing edge along said pressure side wall, a plurality of second trailing edge slots, and a plurality of third trailing edge slots, said plurality of first trailing edge slots and said plurality of second trailing edge slots each comprise an inlet, an exit, and a length measured therebetween, said plurality of second trailing edge slots each have a length that is longer than a length each of said plurality of first and third trailing edge slots, wherein said plurality of second and third trailing edge slots are arranged in an alternating pattern.

7. An airfoil in accordance with claim 6 wherein said pressure side wall and said suction side wall extend radially between a root and a tip, said plurality of slots further comprise a plurality of slots defined within a lower section of said trailing edge and a plurality of slots defined within an upper section of said trailing edge, said plurality of slots within said trailing edge lower section are between said plurality of slots within said trailing edge upper section and said blade root.

8. An airfoil in accordance with claim 7 wherein said at least one second trailing edge slot is defined within said trailing edge upper section.

9. An airfoil in accordance with claim 7 further comprising at least one third trailing edge slot having a length that is shorter than said at least one second trailing edge slot length and said length of said plurality of first trailing edge slots.

10. An airfoil in accordance with claim 9 wherein said at least one third trailing edge slot is defined within said trailing edge upper section.

11. An airfoil in accordance with claim 9 wherein said trailing edge upper section comprises a plurality of second trailing edge slots and a plurality of third trailing edge slots arranged in an alternating pattern extending between said blade tip and said trailing edge lower section.

12. An airfoil in accordance with claim 9 wherein said at least one second trailing edge slot and said at least one third trailing edge slot facilitate increasing a stiffness of said blade trailing edge.

13. An airfoil in accordance with claim 9 wherein said at least one second trailing edge slot and said at least one third trailing edge slot facilitate increasing a vibratory margin of said blade trailing edge.

14. A turbine blade comprising:
    a platform;
    a dovetail extending radially inward from said platform; and
    an airfoil extending radially outward from said platform and comprising a pressure side wall, and a suction side wall, said pressure side wall connected to said suction side wall at a leading edge and a trailing edge, said airfoil further comprising a plurality of first trailing edge slots, a plurality of second trailing edge slots, and a plurality of third trailing edge slots, said plurality of first trailing edge slots and said plurality of second trailing edge slots each extend from said trailing edge along said pressure side wall and each comprise an inlet, an exit, and a length measured therebetween, said plurality of second trailing edge slots each have a length that is longer than a length of each of said plurality of first and third trailing edge slots, wherein said plurality of second and third trailing edge slots are arranged in an alternating pattern.

15. A turbine blade in accordance with claim 14 wherein said airfoil at least one second trailing edge slot facilitates increasing at least one of a stiffness of said airfoil trailing edge and a vibratory margin of said airfoil.

16. A turbine blade in accordance with claim 14 wherein said airfoil pressure side and suction side walls extend radially between a root and a tip, said airfoil trailing edge comprises an upper section and a lower section, said upper section between said lower section and said airfoil tip, said at least one second trailing edge slot is defined only within said trailing edge upper section.

17. A turbine blade in accordance with claim 14 wherein said airfoil further comprises at least one third trailing edge slot having a length that is shorter than said length of said plurality of first trailing edge slots.

18. A turbine blade in accordance with claim 17 wherein said airfoil at least one third trailing edge slot is defined only within said trailing edge upper section.

19. A turbine blade in accordance with claim 17 wherein said airfoil trailing edge upper section comprises a plurality of second trailing edge slots and a plurality of third trailing edge slots arranged in an alternating pattern extending between said blade tip and said trailing edge lower section.

20. A turbine blade in accordance with claim 17 wherein said airfoil trailing edge upper section facilitates increasing a stiffness of said airfoil.

* * * * *